United States Patent
Yu et al.

(10) Patent No.: US 9,581,610 B2
(45) Date of Patent: Feb. 28, 2017

(54) POSITION-IDENTIFIABLE TIRE PRESSURE MONITOR, MONITORING SYSTEM AND METHOD THEREOF

(71) Applicant: ORANGE ELECTRONIC CO., LTD., Taichung (TW)

(72) Inventors: Hung-Chih Yu, Taichung (TW); Ping-Cheng Tsai, Taichung (TW)

(73) Assignee: ORANGE ELECTRONIC CO., LTD., Taichung (TW)

( * ) Notice: Subject to any disclaimer, the term of this patent is extended or adjusted under 35 U.S.C. 154(b) by 270 days.

(21) Appl. No.: 14/606,409

(22) Filed: Jan. 27, 2015

(65) Prior Publication Data

US 2016/0214443 A1   Jul. 28, 2016

(51) Int. Cl.
 *G01M 17/013* (2006.01)
 *G01P 3/00* (2006.01)
 *B60C 23/04* (2006.01)

(52) U.S. Cl.
 CPC ............ *G01P 3/00* (2013.01); *B60C 23/0416* (2013.01); *B60C 23/0489* (2013.01)

(58) Field of Classification Search
 USPC ............ 73/146, 146.2, 115.07; 340/438, 442
 See application file for complete search history.

(56) References Cited

U.S. PATENT DOCUMENTS

| | | | | |
|---|---|---|---|---|
| 8,600,607 B2* | 12/2013 | Kessler | ............... | B60C 23/0416 340/442 |
| 2010/0066524 A1* | 3/2010 | Yu | ....................... | B60C 23/0408 340/447 |
| 2012/0060598 A1* | 3/2012 | Kessler | ............... | B60C 23/0416 73/146.5 |
| 2012/0065832 A1* | 3/2012 | Kessler | ............... | B60C 23/0488 701/29.1 |
| 2012/0194333 A1* | 8/2012 | Kessler | ............... | B60C 23/0416 340/445 |
| 2012/0319831 A1* | 12/2012 | Maehara | ............. | B60C 23/0488 340/447 |
| 2013/0076500 A1* | 3/2013 | Yu | ........................ | H04W 72/02 340/445 |
| 2013/0263655 A1* | 10/2013 | Tebano | ................... | B60C 23/06 73/146.3 |
| 2014/0340213 A1* | 11/2014 | Okada | ................. | B60C 23/0416 340/444 |
| 2015/0020584 A1* | 1/2015 | Okada | ................. | B60C 23/0416 73/146.2 |
| 2015/0231935 A1* | 8/2015 | Wagner | ................... | B60C 23/04 702/141 |

* cited by examiner

*Primary Examiner* — Eric C McCall
(74) *Attorney, Agent, or Firm* — Pai Patent & Trademark Law Firm; Chao-Chang David Pai

(57) ABSTRACT

A method for determining position of a tire pressure monitor equipped on a tire of a vehicle. The method is performed by a controller and comprises: detecting a radial acceleration and a tangential acceleration of the tire; computing a radial-versus-gravity value and a tangent-versus-gravity value based on the radial acceleration, the tangential acceleration and a gravity acceleration; determining an operating state according to variations of the radial-versus-gravity value and the tangent-versus-gravity value; determining whether the operating state is changed to another operating state; and when the operating state is changed, determining a position of the tire pressure monitor according to a change sequence of the operating states.

16 Claims, 11 Drawing Sheets

POSITION-IDENTIFIABLE TIRE PRESSURE MONITOR, MONITORING SYSTEM AND METHOD THEREOF

BACKGROUND OF THE INVENTION

1. Field of the Invention

The present invention relates to a position-identifiable tire pressure monitor, monitoring system and method thereof.

2. Description of Related Art

Tire pressure of a vehicle is a very important factor for ensuring traffic safety. If any one of the tires has insufficient tire pressure, the contact area between the tire and the ground would be expanded to increase the friction, thereby increasing fuel consumption and engine loading. Correspondingly, air temperature inside the tire also rises to expand the air volume in the tire. If the tire is in a weak condition, the tire would be blown-out and crashed. For the driver to monitor tire pressure of the tires, wireless tire pressure monitors are installed in the tires of the vehicle. Each wireless tire pressure monitor detects tire pressure thereon, and sends the detection result to a receiver mounted on a dashboard. Hence, the driver can check the tire pressures displayed on the receiver at any time. When the driver observes that the tire pressure is abnormal during driving, the driver can slow down and pull off the vehicle to roadside to avoid traffic accidents.

Taking a four-wheel vehicle as an example, each tire is equipped with a wireless tire pressure monitor. The four wireless tire pressure monitors can be classified into two front ones and two rear ones, or two left ones and two right ones. To identify the front wireless tire pressure monitor and the rear wireless tire pressure monitor is very simple. For example, the front wireless tire pressure monitors are closer to engine than the rear wireless tire pressure monitors. Accordingly, temperatures of the front wireless tire pressure monitors are higher than those of the rear wireless tire pressure monitors. Hence, temperature is a reference parameter for identifying a front or a rear wireless tire pressure monitor.

However, the left and the right wireless tire pressure monitors have similar temperature properties, such that temperature cannot be the only appropriate reference parameter for identifying the left or the right wireless tire pressure monitors.

SUMMARY OF THE INVENTION

An objective of the present invention is to provide a method for determining position of a tire pressure monitor equipped on a tire of a vehicle. The method is performed by a controller and comprises:

detecting a radial acceleration and a tangential acceleration of the tire;

computing a radial-versus-gravity value and a tangent-versus-gravity value based on the radial acceleration, the tangential acceleration and a gravity acceleration;

determining an operating state according to increasing or decreasing of the radial-versus-gravity value and the tangent-versus-gravity value;

determining whether the operating state is changed to another one; and when the operating state is changed, determining a position of the tire pressure monitor according to a change sequence of the operating states.

Another objective of the present invention is to provide a position-identifiable tire pressure monitor adapted to be equipped on a tire of a vehicle. The tire pressure monitor comprises an accelerometer, a wireless transmitter module and a controller. The accelerometer detects a radial acceleration and a tangential acceleration of the tire. The controller is electrically connected to the accelerometer and the wireless transmitter module. The controller computes a radial-versus-gravity value and a tangent-versus-gravity value based on the radial acceleration, the tangential acceleration and a gravity acceleration, and then determines an operating state according to increasing or decreasing of the radial-versus-gravity value and the tangent-versus-gravity value. When the controller determines that the operating state is changed to another one, the controller determines a position of the tire pressure monitor according to a change sequence of the operating states, and sends out a position information via the wireless transmitter module.

Another objective of the present invention is to provide a position-identifiable tire pressure monitoring system comprising multiple tire pressure monitors and a receiver. The multiple tire pressure monitors are adapted to be equipped on tires of a vehicle respectively. Each tire pressure monitor has a wireless transmitter module and an accelerometer. The accelerometer is for detecting a radial acceleration and a tangential acceleration of the tire, and sending out the radial acceleration and the tangential acceleration via the wireless transmitter module. The receiver is adapted to be equipped in the vehicle and communicates with the tire pressure monitors to receive the radial acceleration and the tangential acceleration. The receiver computes a radial-versus-gravity value and a tangent-versus-gravity value based on the radial acceleration, the tangential acceleration and a gravity acceleration, and then determines an operating state according to increasing or decreasing of the radial-versus-gravity value and the tangent-versus-gravity value. When the receiver determines that the operating state is changed to another one, the receiver determines a position of the tire pressure monitor according to a change sequence of the operating states.

The radial acceleration, the tangential acceleration, the gravity acceleration and the change sequence of the operating states are references for determining whether position of the tire pressure monitor is on the left or on the right. When the left or right identifying result is combined with the front or rear identifying result as disclosed in the prior art, the position of the tire pressure monitor can be precisely determined as front-left, front-right, rear-left or rear-right. Embodiments of the present invention are described in detail in the following.

DETAILED DESCRIPTION OF THE PREFERRED EMBODIMENT

Figure 1:
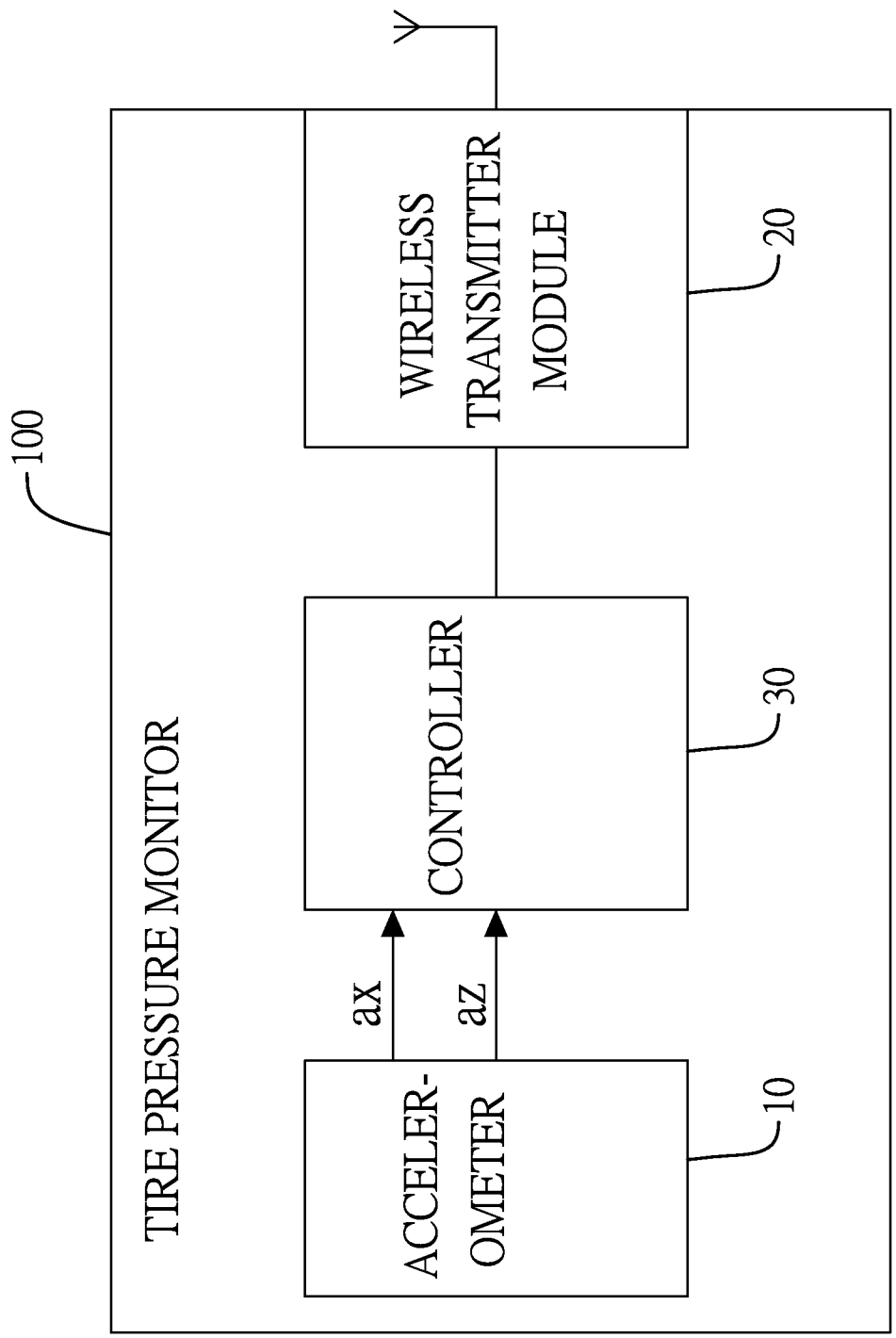
FIG. 1 is a circuit block diagram of an embodiment of a position-identifiable tire pressure monitor of the present invention.

A position-identifiable tire pressure monitor of the present invention is adapted to be equipped on a tire of a vehicle. With reference to FIG. 1, the tire pressure monitor 100 of the present invention comprises an accelerometer 10, a wireless transmitter module 20 and a controller 30.

Figure 2:
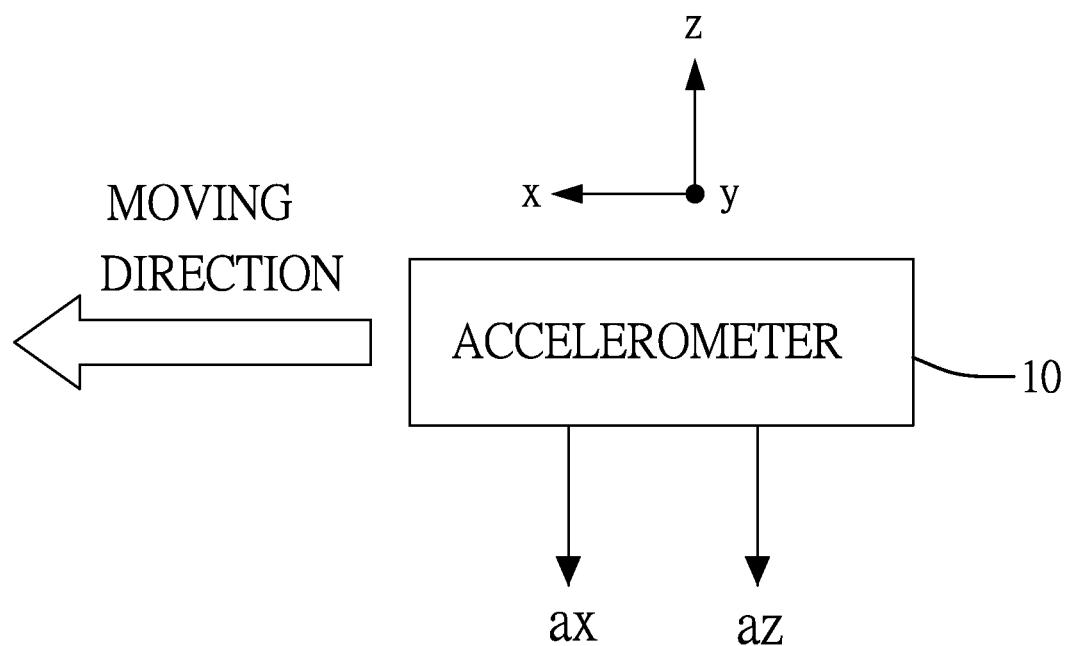
FIG. 2 is a schematic operating diagram of the accelerometer of the tire pressure monitor of the present invention.
Figure 3:
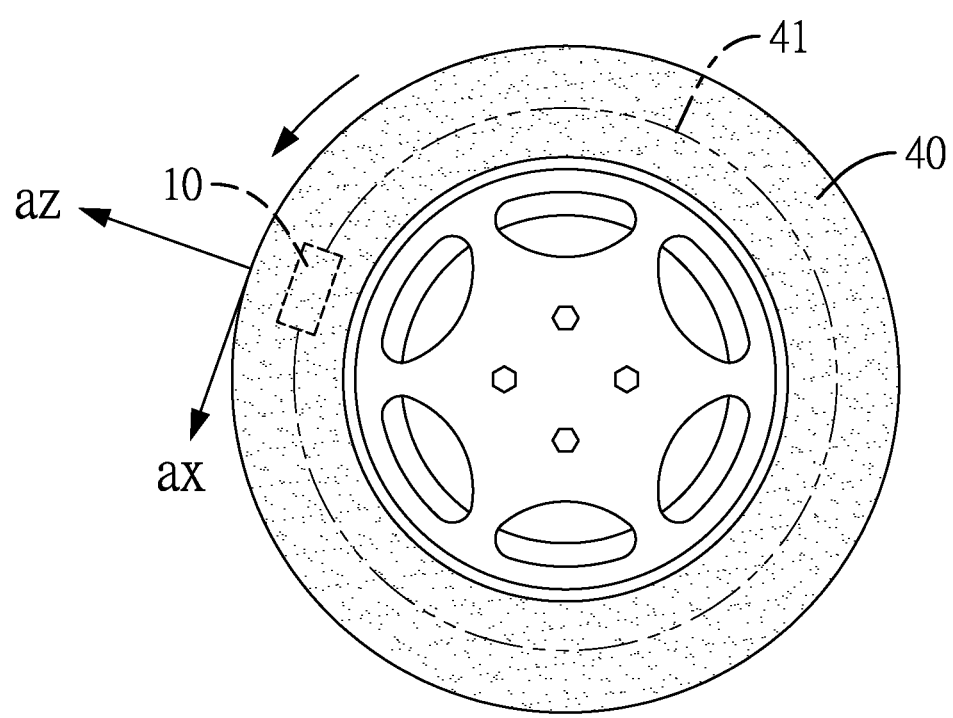
FIG. 3 is a schematic view showing the accelerometer of the tire pressure monitor moving with a rolling tire.

The accelerometer 10 can be a gravity sensor (G-sensor) comprising a circuit board and an integrated circuit (IC) disposed on the circuit board. The IC is used to detect accelerations along multiple axes. In this embodiment, with reference to FIG. 2, said axes include x-axis, y-axis and z-axis in three-dimensional space. For example, the y-axis can be a rotation axis of the tire. When the accelerometer 10 is moved, the accelerometer 10 correspondingly detects a radial acceleration and a tangential acceleration of the moving tire. With reference to FIG. 3, the accelerometer 10 is equipped on the tire 40. The accelerometer 10 moves along a closed path 41 when the tire 40 rolls. Hence, during time period that the accelerometer 10 moves along the closed path 41, the acceleration along the x-axis is defined as the tangential acceleration (ax), and the acceleration along the z-axis is defined as the radial acceleration (az).

The controller 30 is electrically connected to the accelerometer 10 and the wireless transmitter module 20. The controller 30 stores gravity acceleration (g) as a default value. When the controller 30 receives the tangential acceleration (ax) and the radial acceleration (az) from the accelerometer 10, the controller 30 computes a radial-versus-gravity value and a tangent-versus-gravity value based on the tangential acceleration (ax), the radial acceleration (az) and the gravity acceleration (g). Further, the controller 30 determines an operating state according to variations of the radial-versus-gravity value and the tangent-versus-gravity value, and then determines whether the operating state is changed to another operating state. In this embodiment, the controller 30 can identify multiple operating states including, sequentially, a first operating state, a second operating state, a third operating state and a fourth operating state. The relationship of the four operating states, the radial-versus-gravity value and the tangent-versus-gravity value are disclosed in the following table:

| | radial-versus-gravity value | tangent-versus-gravity value |
|---|---|---|
| first operating state | Increase | Increase |
| second operating state | Increase | Decrease |
| third operating state | Decrease | Decrease |
| fourth operating state | Decrease | Increase |

Taking a 15-inch tire as an example, the tire approximately rolls 1.9 meters on the ground when the tire finishes a complete revolution. When velocity of the vehicle is 30 kilometers/hour or 8.3 meters/second, the tire would spend 228 ms to finish the complete revolution. As a result, the accelerometer 10 continuously detects 28 radial accelerations (ax) and 28 tangential accelerations (az) under sampling rate of 125 Hz or sampling period of 8 ms. The tangential acceleration (ax) and the radial acceleration (az) sampled by the accelerometer 10 are provided to the controller 10 to compute the radial-versus-gravity value and the tangent-versus-gravity value. Afterwards, the controller 30 compares a prior radial-versus-gravity value with a subsequent one; meanwhile, the controller 30 also compares a prior tangent-versus-gravity value with a subsequent one. Based on increasing or decreasing of the radial-versus-gravity value and the tangent-versus-gravity value, the controller 30 determines the operating state as mentioned above.

When the controller 30 determines the operating state is changed to another operating state, the controller 30 determines a position of the tire pressure monitor according to a change sequence of the operating states. When the operating states are changed forwardly, the position of the tire pressure monitor is determined as a first position. When the operating states are changed reversely, the position of the tire pressure monitor is determined as a second position opposite to the first position. For instance, when the first position is at a left tire of the vehicle, the second position is at a right tire of the vehicle. Inversely, when the first position is at a right tire of the vehicle, the second position is at a left tire of the vehicle.

In this embodiment, the operating states are determined to be changed forwardly when the first operating state is changed to the second operating state, the second operating state is changed to the third operating state, the third operating state is changed to the fourth operating state, or the fourth operating state is changed to the first operating state. Further, the operating states are determined to be changed reversely when the first operating state is changed to the fourth operating state, the fourth operating state is changed to the third operating state, the third operating state is changed to the second operating state, or the second operating state is changed to the first operating state.

Figure 4:
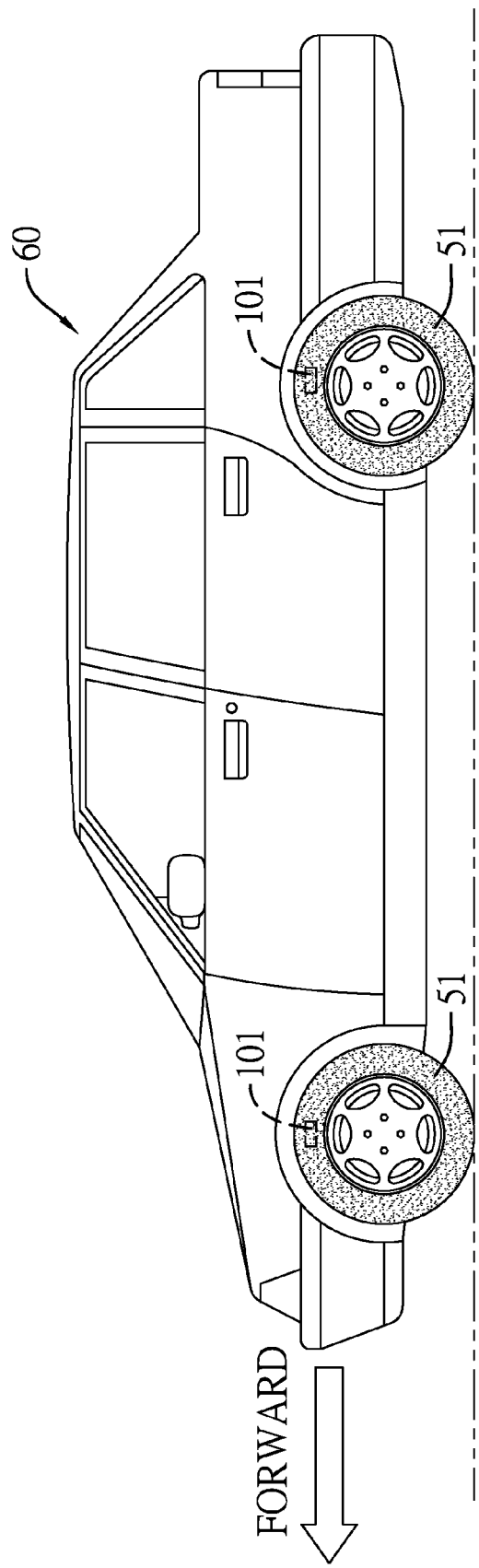
FIG. 4 is a schematic view showing left tire pressure monitors equipped on left tires of a vehicle.
Figure 5:
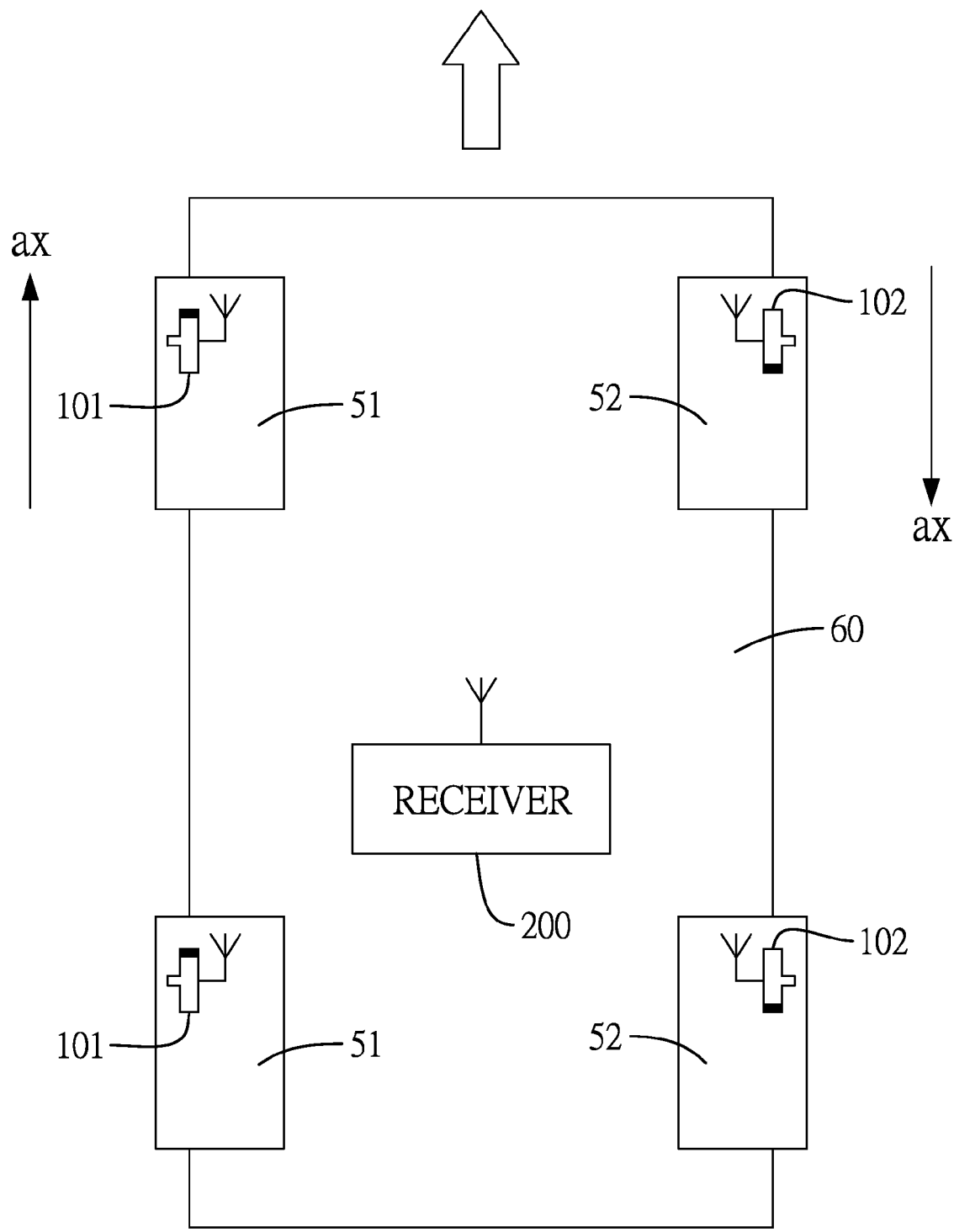
FIG. 5 is a schematic diagram showing four tire pressure monitors equipped on four tires respectively and a receiver equipped in the vehicle.

With reference to FIG. 4 and FIG. 5, the first position is the left tire and the second position is the right tire. In general, installing directions of the left tire pressure monitors 101 are inverse to the right tire pressure monitors 102. When the vehicle 60 is driven forward, the left tire pressure monitors 101 and the right tire pressure monitors 102 move along their respective closed path. Please note that the position of the left tire pressure monitors 101 shown in FIG. 5 corresponds to the first position P1 of FIG. 6A, and the position of the right tire pressure monitors 102 in shown FIG. 5 corresponds to the first position Q1 of FIG. 8A.

Figure 6A:
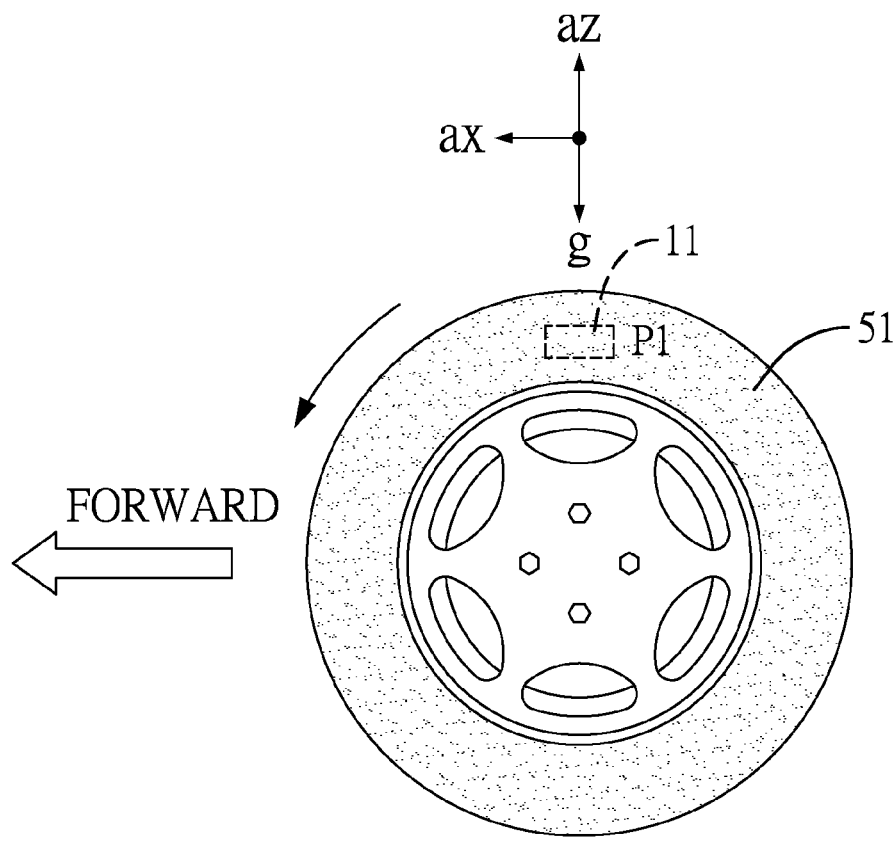
FIG. 6A is a schematic view showing the accelerometer is passing through a first point P1.
Figure 6B:
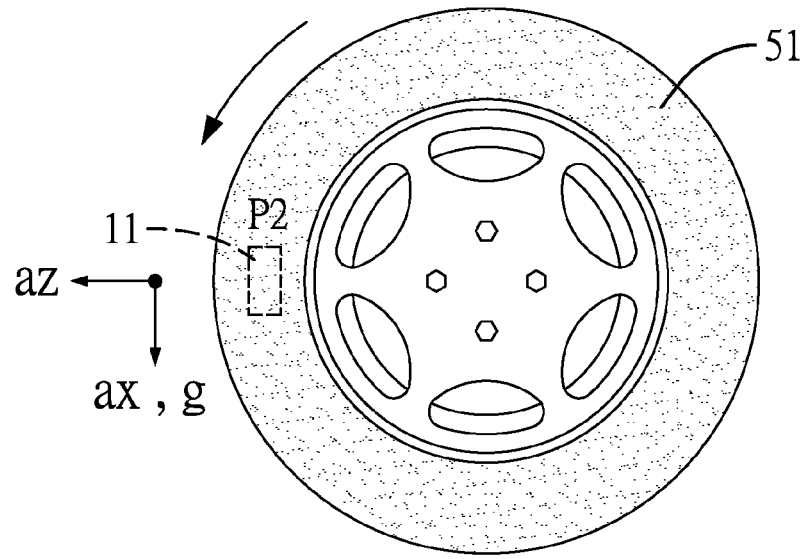
FIG. 6B is a schematic view showing the accelerometer is passing through a second point P2.
Figure 6C:
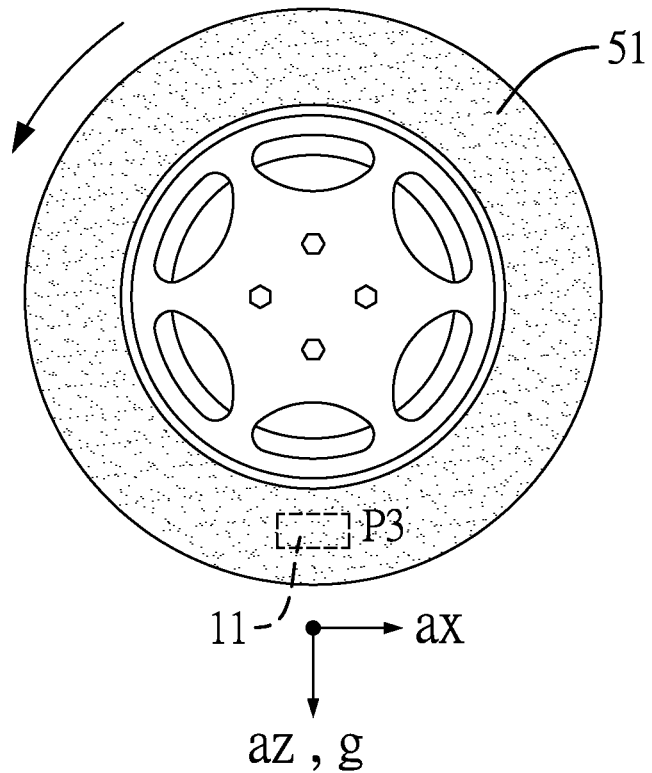
FIG. 6C is a schematic view showing the accelerometer is passing through a third point P3.
Figure 6D:
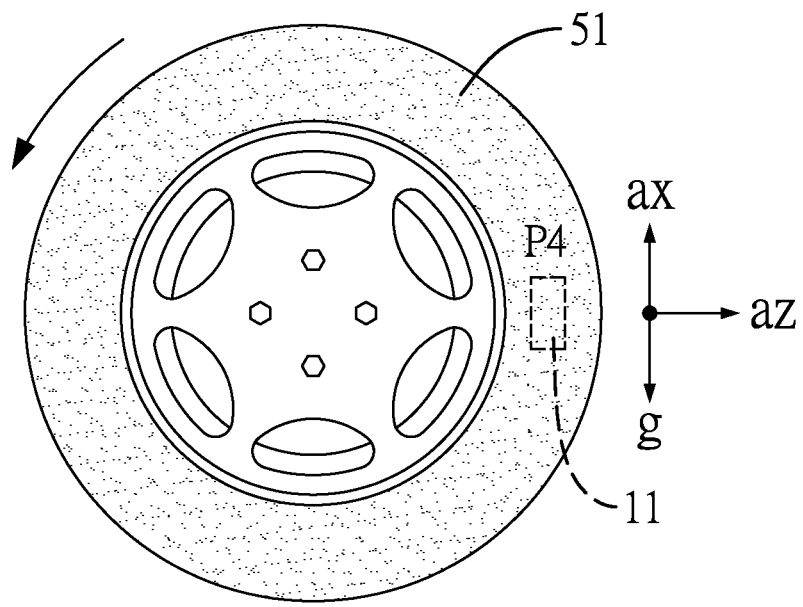
FIG. 6D is a schematic view showing the accelerometer is passing through a fourth point P4.

Regarding the rolling left tire pressure monitors 101, for convenience in description, the closed path comprises a first point P1, a second point P2, a third point P3 and a fourth point P4 as shown in FIGS. 6A-6D. FIGS. 6A-6D show side views of the left tire 51. With reference to FIG. 6A, when the accelerometer 11 is passing through the first point P1 (as a top of the tire), direction of vector of the radial acceleration (az) is opposite to that of the gravity acceleration (g). The controller 30 subtracts the radial acceleration (az) from the gravity acceleration (g) to obtain the radial-versus-gravity value (g−az). With reference to FIG. 6B, when the accelerometer 11 is passing through the second point P2, vector of the radial acceleration (az) has zero component along the z-axis, such that the radial-versus-gravity value is equal to the gravity acceleration (g). With reference to FIG. 6C, when the accelerometer 11 is passing through the third point P3, direction of vector of the radial acceleration (az) is same as that of the gravity acceleration (g). The controller 30 adds the radial acceleration (az) to the gravity acceleration (g) to obtain the radial-versus-gravity value (g+az). With reference to FIG. 6D, when the accelerometer 11 is passing through the fourth point P4, vector of the radial acceleration (az) has zero component along the z-axis, such that the radial-versus-gravity value is equal to the gravity acceleration (g).

When the left tire 51 finishes a complete revolution, the left tire pressure monitors 101 passes through the first point P1, the second point P2, the third point P3, the fourth point P4 and the first point P1 in sequence. Accordingly, with reference to FIG. 7, the radial-versus-gravity value is sequentially increased to g from g−az, increased to g+az from g, decreased to g from g+az, and decreased to g−az from g.

Regarding the tangent-versus-gravity value, with reference to FIG. 6A, when the accelerometer 11 is passing through the first point P1, vector of the tangential acceleration (ax) has zero component along the z-axis, such that the tangent-versus-gravity value is equal to the gravity acceleration (g). With reference to FIG. 6B, when the accelerometer 11 is passing through the second point P2, direction of vector of the tangential acceleration (ax) is same as that of the gravity acceleration (g). The controller 30 adds the tangential acceleration (ax) to the gravity acceleration (g) to obtain the tangent-versus-gravity value (g+ax). With reference to FIG. 6C, when the accelerometer 11 is passing through the third point P3, vector of the tangential acceleration (ax) has zero component along the z-axis, such that the tangent-versus-gravity value is equal to the gravity acceleration (g). With reference to FIG. 6D, when the accelerometer 11 is passing through the fourth point P4, direction of vector of the tangential acceleration (ax) is opposite to that of the gravity acceleration (g). The controller 30 subtracts the tangential acceleration (ax) from the gravity acceleration (g) to obtain the tangent-versus-gravity value (g−ax).

When the left tire 51 finishes a complete revolution, the left tire pressure monitors 101 passes through the first point P1, the second point P2, the third point P3, the fourth point P4 and the first point P1 in sequence. Accordingly, with reference to FIG. 7, the tangent-versus-gravity value is sequentially increased to g+ax from g, decreased to g from g+ax, decreased to g−ax from g, and increased to g from g−ax.

Figure 7:
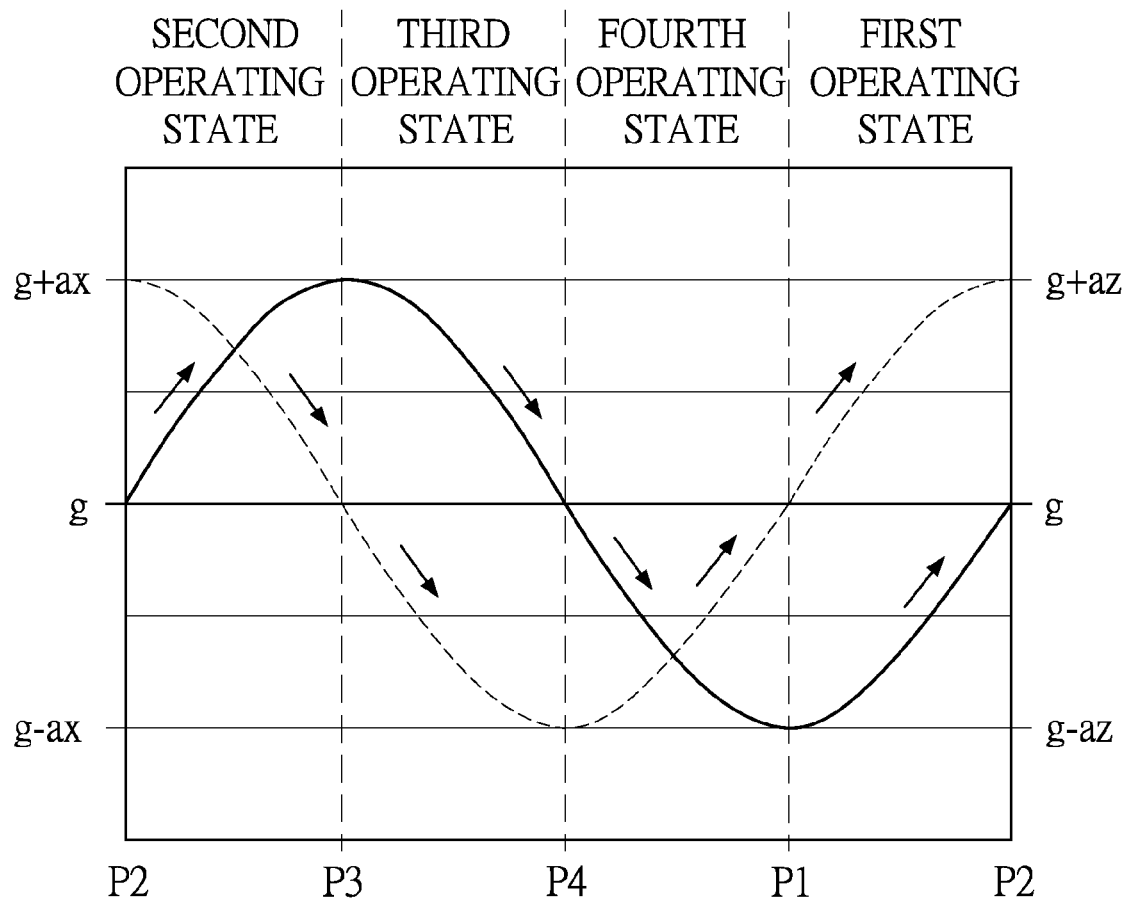
FIG. 7 is a waveform diagram showing the relationship of the operating states, the tangent-versus-gravity value and the radial-versus-gravity value for a left tire.

With reference to FIG. 7, during time period that the accelerometer 11 moves to the second point P2 from the first point P1, the radial-versus-gravity value and the tangent-versus-gravity value are simultaneously increased, such that the first operating state is determined when both the radial-versus-gravity value and the tangent-versus-gravity value are increased. Similarly, during time period that the accelerometer 11 moves to the third point P3 from the second point P2, the radial-versus-gravity value is increased and the tangent-versus-gravity value is decreased, such that the second operating state is determined when the radial-versus-gravity value is increased and the tangent-versus-gravity value is decreased. During time period that the accelerometer 11 moves to the fourth point P4 from the third point P3, the radial-versus-gravity value and the tangent-versus-gravity value are simultaneously decreased, such that the third operating state is determined when both the radial-versus-gravity value and the tangent-versus-gravity value are decreased. During time period that the accelerometer 11 moves to the first point P1 from the fourth point P4, the radial-versus-gravity value is decreased and the tangent-versus-gravity value is increased, such that the fourth operating state is determined when the radial-versus-gravity value is decreased and the tangent-versus-gravity value is increased.

As a result, when the controller 30 determines that the first operating state is changed to the second operating state, the second operating state is changed to the third operating state, the third operating state is changed to the fourth operating state, or the fourth operating state is changed to the first operating state, the controller 30 determines that the accelerometer 11 belongs to the left tire pressure monitors 101 equipped on the left tire 51.

The computing of the radial-versus-gravity value for the right tire pressure monitor 102 can be deduced from that of the left tire pressure monitors 101, and would not be repeated here. FIGS. 8A-8D show side views of the right tire 52. With reference to FIGS. 8A-8D, when the right tire 52 finishes a complete revolution, the right tire pressure monitors 102 pass through the first point Q1, the second point Q2, the third point Q3, the fourth point Q4 and the first point Q1 in sequence. Accordingly, with reference to FIG. 9, the radial-versus-gravity value is sequentially increased to g from g−az, increased to g+az from g, decreased to g from g+az, and decreased to g−az from g.

Figure 8A:
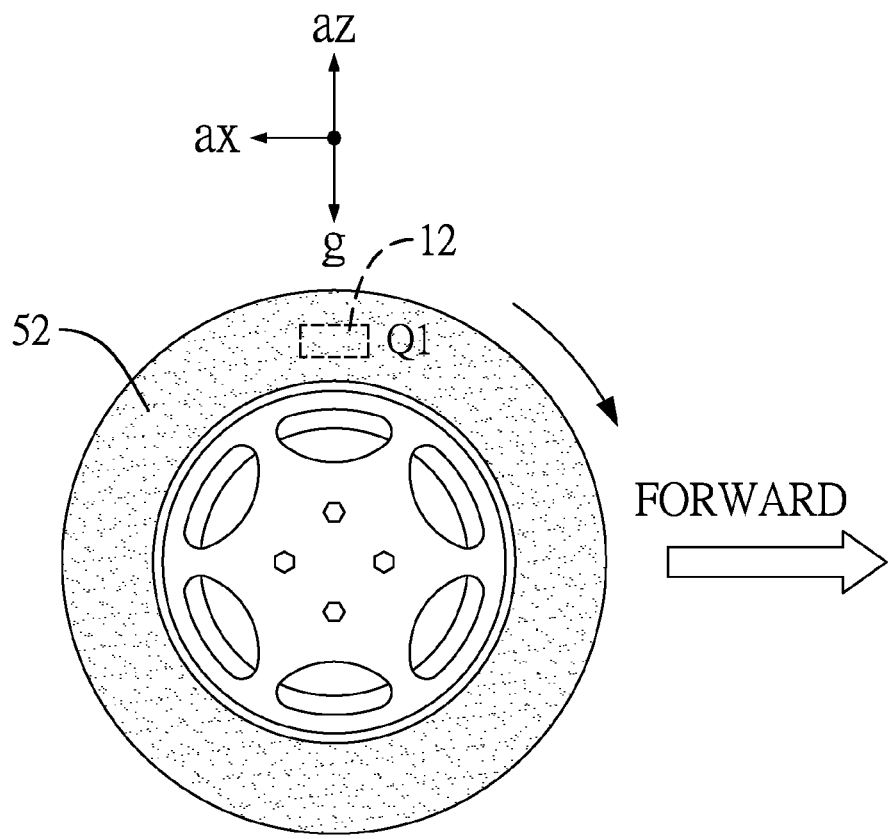
FIG. 8A is a schematic view showing the accelerometer is passing through a first point Q1.
Figure 8B:
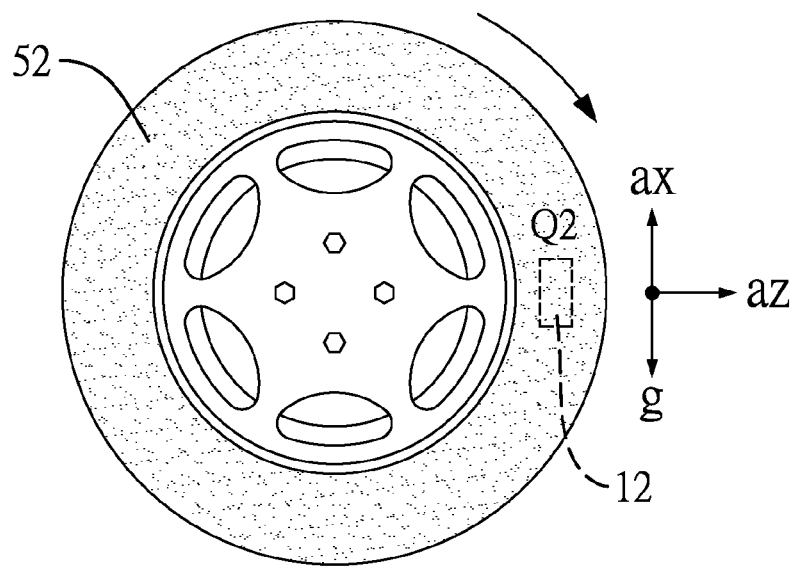
FIG. 8B is a schematic view showing the accelerometer is passing through a second point Q2.
Figure 8C:
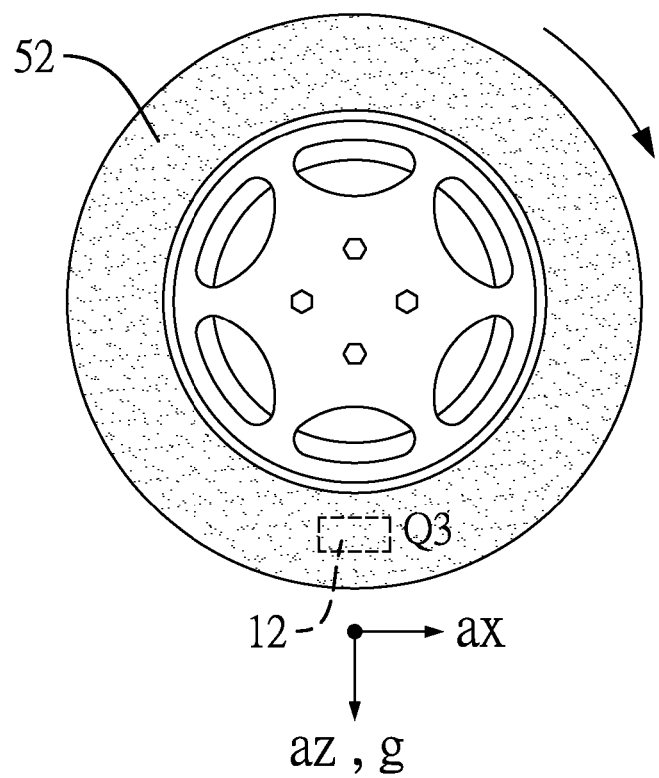
FIG. 8C is a schematic view showing the accelerometer is passing through a third point Q3.
Figure 8D:
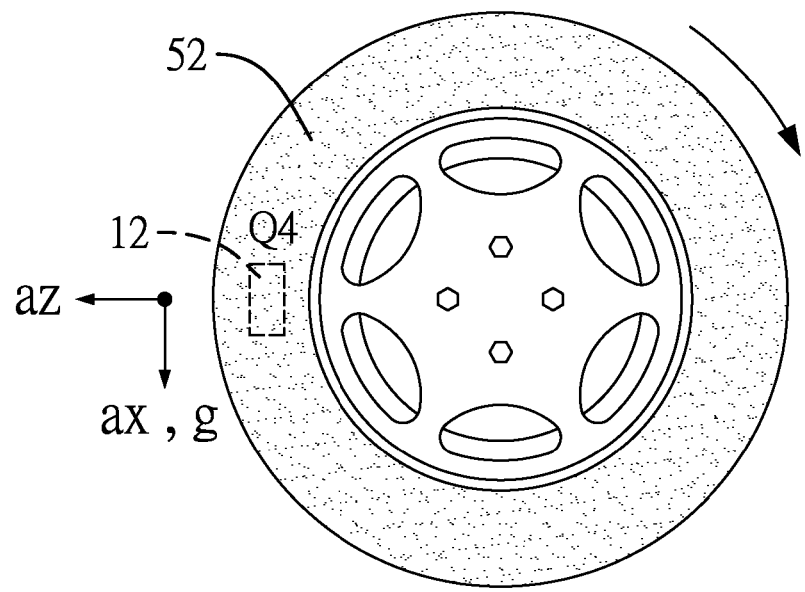
FIG. 8D is a schematic view showing the accelerometer is passing through a fourth point Q4.

Regarding the tangent-versus-gravity value of the right tire pressure monitors 102, installing direction of the right tire pressure monitors 102 is inverse to that of the left tire pressure monitors 101. With reference to FIG. 8A, when the accelerometer 11 is passing through the first point Q1, vector of the tangential acceleration (ax) has zero component along the z-axis, such that the tangent-versus-gravity value is equal to the gravity acceleration (g). With reference to FIG. 8B, when the accelerometer 11 is passing through the second point Q2, direction of vector of the tangential acceleration (ax) is opposite to that of the gravity acceleration (g). The controller 30 subtracts the tangential acceleration (ax) from the gravity acceleration (g) to obtain the tangent-versus-gravity value (g−ax). With reference to FIG. 8C, when the accelerometer 11 is passing through the third point Q3, vector of the tangential acceleration (ax) has zero component along the z-axis, such that the tangent-versus-gravity value is equal to the gravity acceleration (g). With reference to FIG. 8D, when the accelerometer 11 is passing through the fourth point Q4, direction of vector of the tangential acceleration (ax) is same as that of the gravity acceleration (g). The controller 30 adds the tangential acceleration (ax) to the gravity acceleration (g) to obtain the tangent-versus-gravity value (g+ax).

Figure 9:
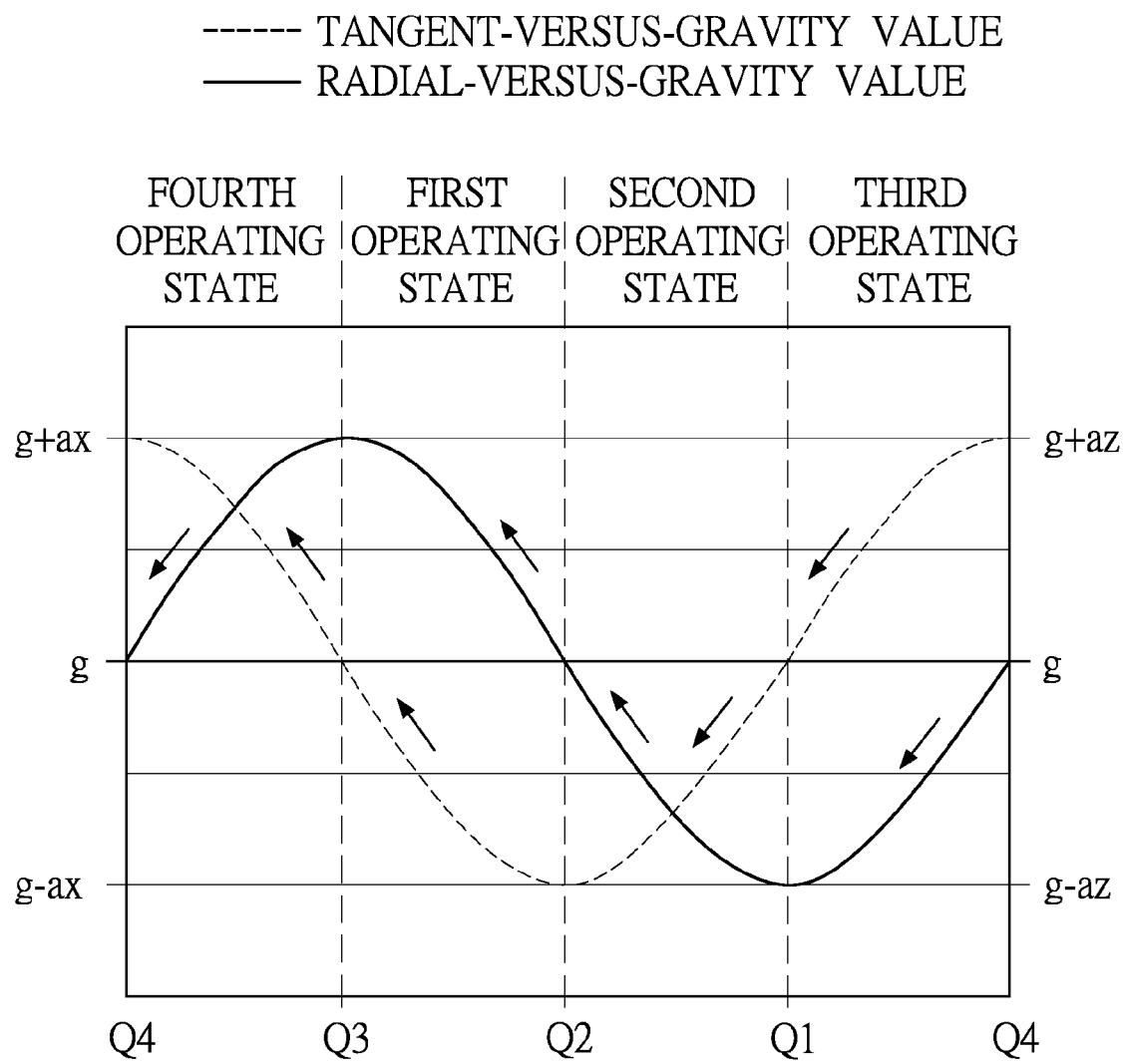
FIG. 9 is a waveform diagram showing the relationship of the operating states, the tangent-versus-gravity value and the radial-versus-gravity value for a right tire.

When the right tire 52 finishes a complete revolution, with reference to FIG. 9, the tangent-versus-gravity value is sequentially decreased to g−ax from g, increased to g from g−ax, increased to g+ax from g, and decreased to g from g+ax. Hence, during time period that the accelerometer 11 moves to the second point Q2 from the first point Q1, the radial-versus-gravity value is increased and the tangent-versus-gravity value is decreased, which corresponds to the second operating state as disclosed in the above table. Similarly, during time period that the accelerometer 11 moves to the third point Q3 from the second point Q2, the radial-versus-gravity value and the tangent-versus-gravity value are simultaneously increased, which corresponds to the first operating state. During time period that the accelerometer 11 moves to the fourth point Q4 from the third point Q3, the radial-versus-gravity value is decreased and the tangent-versus-gravity value is increased, which corresponds to the fourth operating state. During time period that the accelerometer 11 moves to the first point Q1 from the fourth point Q4, the radial-versus-gravity value and the tangent-versus-gravity value are simultaneously decreased, which corresponds to the third operating state.

As a result, when the controller 30 determines that the first operating state is changed to the fourth operating state, the fourth operating state is changed to the third operating state, the third operating state is changed to the second operating state, or the second operating state is changed to the first operating state, the controller 30 determines that the accelerometer 11 belongs to the right tire pressure monitors 102 equipped on the right tire 52.

With reference to FIG. 1 and FIG. 5, a main function of the tire pressure monitor 100 is to detect tire pressure information of the tire thereon. When the controller 30 detects the tire pressure information, the controller 30 combines the tire pressure information with the position information to form combined information, and then transmits the combined information to a receiver 200 installed on the vehicle 60 via the wireless transmitter module 20. Therefore, the receiver 200 can distinguish the tire pressure of the left tire 51 and the right tire 52 according to the position information.

In addition, the present invention provides a position-identifiable tire pressure monitoring system. Taking FIG. 5 as an example, the monitoring system comprises multiple tire pressure monitors 101, 102 and a receiver 200. Each tire pressure monitor has the accelerometer 10 and the wireless transmitter module 20 as shown in FIG. 1. As mentioned above, the accelerometer 10 is used to detect the tangential acceleration (ax) and the radial acceleration (az) of a rolling tire. The wireless transmitter module 20 is used to send the tangential acceleration (ax) and the radial acceleration (az) to the receiver 200. When the receiver 200 receives the tangential acceleration (ax) and the radial acceleration (az) from the multiple tire pressure monitors 101, 102, the receiver 200 determines their position information according to the change sequence of the operating states as disclosed above.

What is claimed is:

1. A method for determining position of a tire pressure monitor equipped on a tire of a vehicle, the method performed by a controller and comprising:
   detecting a radial acceleration and a tangential acceleration of the tire;
   computing a radial-versus-gravity value and a tangent-versus-gravity value based on the radial acceleration, the tangential acceleration and a gravity acceleration;
   determining an operating state according to variations of the radial-versus-gravity value and the tangent-versus-gravity value;
   determining whether the operating state is changed to another operating state; and
   when the operating state is changed, determining a position of the tire pressure monitor according to a change sequence of the operating states.

2. The method as claimed in claim 1, wherein
   when the operating states are changed forwardly, the position of the tire pressure monitor is determined as a first position; and
   when the operating states are changed reversely, the position of the tire pressure monitor is determined as a second position opposite to the first position.

3. The method as claimed in claim 2, wherein
   the operating states comprise sequentially a first operating state, a second operating state, a third operating state and a fourth operating state;
   the operating states are determined to be changed forwardly when the first operating state is changed to the second operating state, the second operating state is changed to the third operating state, the third operating state is changed to the fourth operating state, or the fourth operating state is changed to the first operating state; and
   the operating states are determined to be changed reversely when the first operating state is changed to the fourth operating state, the fourth operating state is changed to the third operating state, the third operating state is changed to the second operating state, or the second operating state is changed to the first operating state.

4. The method as claimed in claim 3, wherein in the step of determining an operating state,
   the first operating state is determined when both the radial-versus-gravity value and the tangent-versus-gravity value are increased;
   the second operating state is determined when the radial-versus-gravity value is increased and the tangent-versus-gravity value is decreased;
   the third operating state is determined when both the radial-versus-gravity value and the tangent-versus-gravity value are decreased; and
   the fourth operating state is determined when the radial-versus-gravity value is decreased and the tangent-versus-gravity value is increased.

5. The method as claimed in claim 4, wherein
   when the first position is at a left tire of a vehicle, the second position is at a right tire of the vehicle;
   when the first position is at a right tire of a vehicle, the second position is at a left tire of the vehicle.

6. A position-identifiable tire pressure monitor adapted to be equipped on a tire of a vehicle, the tire pressure monitor comprising:
   an accelerometer detecting a radial acceleration and a tangential acceleration of the tire;
   a wireless transmitter module; and
   a controller electrically connected to the accelerometer and the wireless transmitter module, wherein the controller computes a radial-versus-gravity value and a tangent-versus-gravity value based on the radial acceleration, the tangential acceleration and a gravity acceleration, and then determines an operating state according to variations of the radial-versus-gravity value and the tangent-versus-gravity value; and
   when the controller determines that the operating state is changed to another operating state, the controller determines a position of the tire pressure monitor according to a change sequence of the operating states, and sends out a position information via the wireless transmitter module.

7. The tire pressure monitor as claimed in claim 6, wherein
when the operating states are changed forwardly, the position of the tire pressure monitor is determined as a first position; and
when the operating states are changed reversely, the position of the tire pressure monitor is determined as a second position opposite to the first position.

8. The tire pressure monitor as claimed in claim 7, wherein
the operating states comprise sequentially a first operating state, a second operating state, a third operating state and a fourth operating state;
the operating states are determined to be changed forwardly when the first operating state is changed to the second operating state, the second operating state is changed to the third operating state, the third operating state is changed to the fourth operating state, or the fourth operating state is changed to the first operating state; and
the operating states are determined to be changed reversely when the first operating state is changed to the fourth operating state, the fourth operating state is changed to the third operating state, the third operating state is changed to the second operating state, or the second operating state is changed to the first operating state.

9. The tire pressure monitor as claimed in claim 8, wherein in the step of determining an operating state,
the first operating state is determined when both the radial-versus-gravity value and the tangent-versus-gravity value are increased;
the second operating state is determined when the radial-versus-gravity value is increased and the tangent-versus-gravity value is decreased;
the third operating state is determined when both the radial-versus-gravity value and the tangent-versus-gravity value are decreased; and
the fourth operating state is determined when the radial-versus-gravity value is decreased and the tangent-versus-gravity value is increased.

10. The tire pressure monitor as claimed in claim 9, wherein
when the first position is at a left tire of a vehicle, the second position is at a right tire of the vehicle; and
when the first position is at a right tire of a vehicle, the second position is at a left tire of the vehicle.

11. A position-identifiable tire pressure monitoring system comprising:
multiple tire pressure monitors adapted to be equipped on tires of a vehicle respectively, each tire pressure monitor having
a wireless transmitter module; and
an accelerometer for detecting a radial acceleration and a tangential acceleration of the tire, and sending out the radial acceleration and the tangential acceleration via the wireless transmitter module; and
a receiver adapted to be equipped in the vehicle and communicating with the tire pressure monitors to receive the radial acceleration and the tangential acceleration, wherein the receiver computes a radial-versus-gravity value and a tangent-versus-gravity value based on the radial acceleration, the tangential acceleration and a gravity acceleration, and then determines an operating state according to variations of the radial-versus-gravity value and the tangent-versus-gravity value; and
when the receiver determines that the operating state is changed to another operating state, the receiver determines a position of the tire pressure monitor according to a change sequence of the operating states.

12. The system as claimed in claim 11, wherein
when the operating states are changed forwardly, the position of the tire pressure monitor is determined as a first position; and
when the operating states are changed reversely, the position of the tire pressure monitor is determined as a second position opposite to the first position.

13. The system as claimed in claim 12, wherein
the operating states comprise sequentially a first operating state, a second operating state, a third operating state and a fourth operating state;
the operating states are determined to be changed forwardly when the first operating state is changed to the second operating state, the second operating state is changed to the third operating state, the third operating state is changed to the fourth operating state, or the fourth operating state is changed to the first operating state; and
the operating states are determined to be changed reversely when the first operating state is changed to the fourth operating state, the fourth operating state is changed to the third operating state, the third operating state is changed to the second operating state, or the second operating state is changed to the first operating state.

14. The system as claimed in claim 13, wherein in the step of determining an operating state,
the first operating state is determined when both the radial-versus-gravity value and the tangent-versus-gravity value are increased;
the second operating state is determined when the radial-versus-gravity value is increased and the tangent-versus-gravity value is decreased;
the third operating state is determined when both the radial-versus-gravity value and the tangent-versus-gravity value are decreased; and
the fourth operating state is determined when the radial-versus-gravity value is decreased and the tangent-versus-gravity value is increased.

15. The system as claimed in claim 13, wherein
when the first position is at a left tire of a vehicle, the second position is at a right tire of the vehicle; and
when the first position is at a right tire of a vehicle, the second position is at a left tire of the vehicle.

16. The system as claimed in claim 14, wherein
when the first position is at a left tire of a vehicle, the second position is at a right tire of the vehicle; and
when the first position is at a right tire of a vehicle, the second position is at a left tire of the vehicle.

* * * * *